United States Patent [19]
Box

[11] 4,037,750
[45] July 26, 1977

[54] TRANSPORT-DISPLAY CASE

[76] Inventor: Theodor M. Box, 1108 Eileen Road, Brielle, N.J. 08730

[21] Appl. No.: 566,819

[22] Filed: Apr. 10, 1975

[51] Int. Cl.² ............... B65D 21/02; B65D 11/10
[52] U.S. Cl. ............................. 220/4 E; 206/505; 206/519
[58] Field of Search ........... 220/4 B, 4 E; 206/507, 206/505, 509, 519

[56] References Cited

U.S. PATENT DOCUMENTS

| | | | |
|---|---|---|---|
| 2,432,039 | 3/1969 | Howitt | 220/4 D |
| 3,018,003 | 1/1962 | Lockwood | 220/4 E |
| 3,103,278 | 9/1963 | Kuzma | 220/23.6 |
| 3,696,966 | 10/1972 | Herolzer | 206/509 |
| 3,754,646 | 8/1973 | Henig | 220/4 E |
| 3,773,213 | 11/1973 | Frederick | 206/507 |
| 3,952,903 | 4/1976 | Sanders | 220/4 E |

FOREIGN PATENT DOCUMENTS

| | | | |
|---|---|---|---|
| 1,486,241 | 5/1969 | Germany | 220/4 E |

Primary Examiner—George E. Lowrance

[57] ABSTRACT

A reusable enclosed transport case made up of a pair of complementary interlocking members each having a base, a wall along a first edge of the base and a pair of opposed side walls adjoining that wall is disclosed. During shipping, the two interlocking members are locked together to safely retain and protect the contents of the crate. However, upon delivery, one of the interlocking members is removed to provide a display case which when emptied may be returned along with the other member, to the shipper for reuse. Other features include means to permit ease of stacking of the interlocking members for return to the shipper and means to permit normal and criss-cross palletizing of a plurality of the crates one on top the other.

3 Claims, 12 Drawing Figures

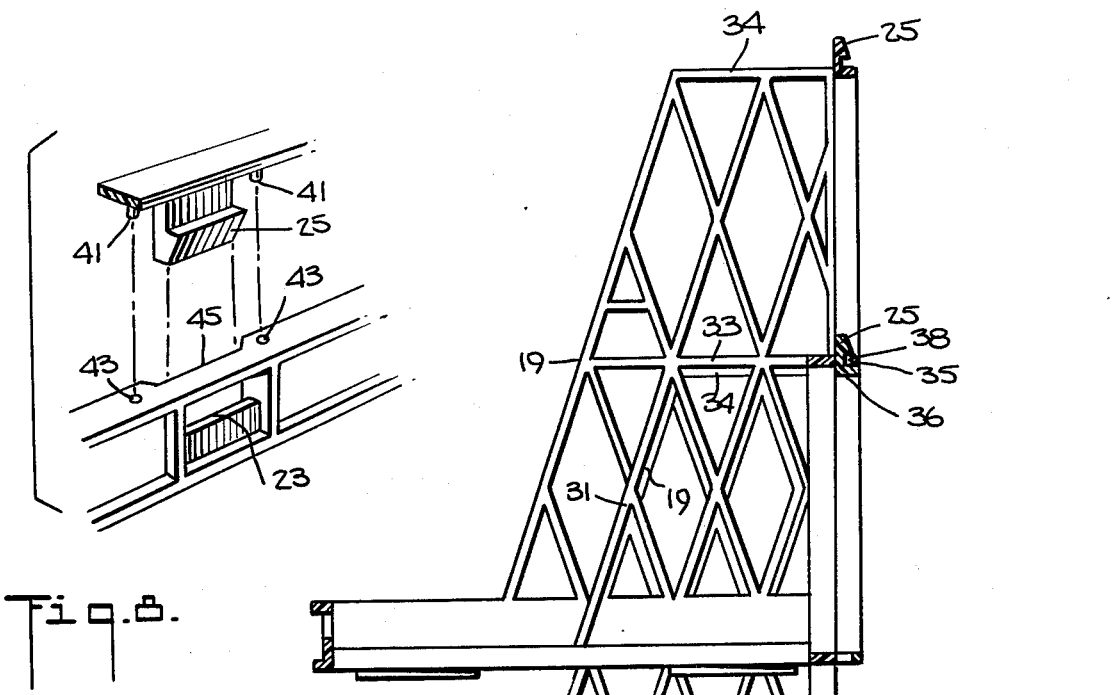
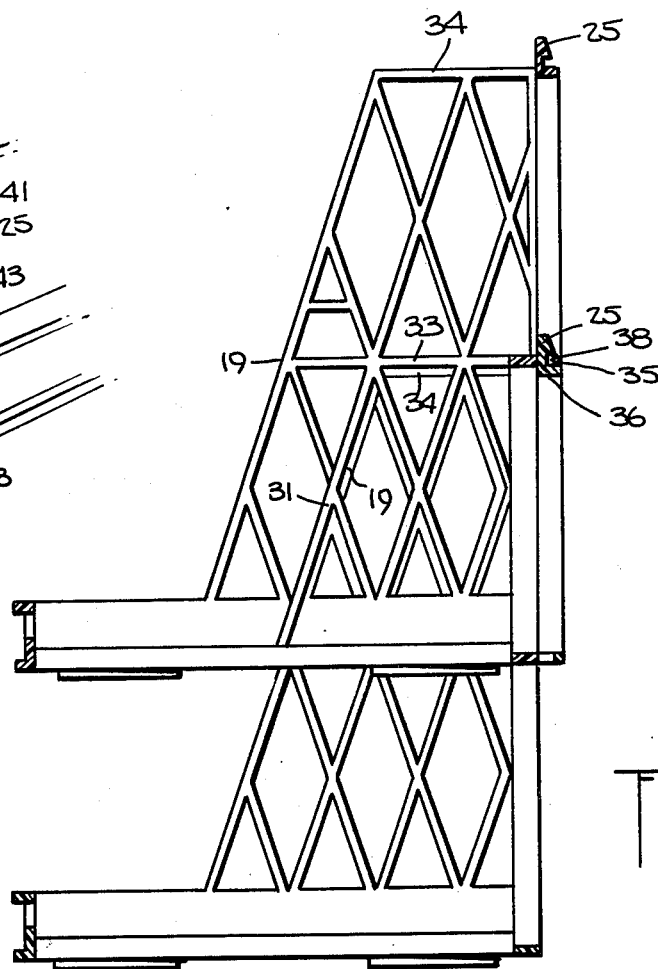
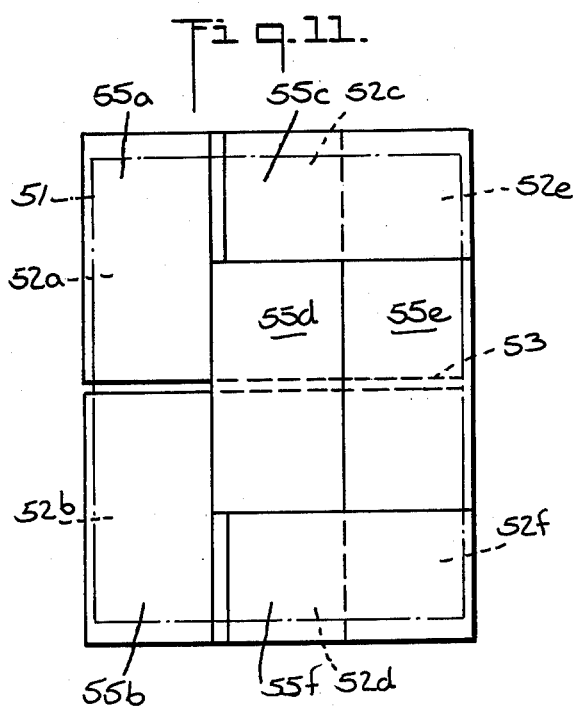
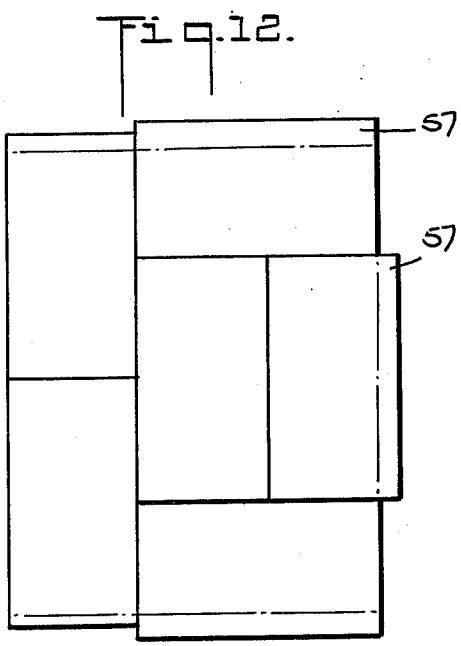

TRANSPORT-DISPLAY CASE

BACKGROUND OF THE INVENTION

This invention relates to transport-display crates in general and more particularly to an improved transport-display case made up of a pair of complementary interlocking members which is capable of being reused.

The typical practice in the prior art with regard to transport and display cases has been to either use a nonreuseable cardboard box which after shipping could be cut to form a display case which was then placed on the shelf in the store or alternatively to use crates which were reuseable but which then could not be used for the dual purpose of transport and display. In other words, the goods would have to be emptied out of the crate and stacked on the shelves. The first solution is wasteful and expensive in that, in most cases, the cardboard crates are not recycled but usually burned or disposed of in some other manner. The second solution is time consuming in that it requires a large plurality of items in the crate to be unloaded and stacked on a shelf in the store also entailing additional expense.

Typical of the use of crates of this nature are crates used for transporting eggs to stores. If a reuseable crate is employed, each of the individual egg cartons, normally containing a dozen eggs, must be removed and stacked on proper shelves in the store. When crates which can be cut to form display crates are used for transporting the eggs the expense is greatly increased since crates for transporting a fragile item such as eggs must be of a substantially rigid construction to protect the contents.

In view of these various problems, need for a reuseable crate which can be used for both transport and display becomes evident.

SUMMARY OF THE INVENTION

The present invention provides such a transport-display crate. In essence, the crate is comprised of a pair of complementary interlocking members each having a base, a wall along a first edge of the base, a pair of opposed side walls adjoining that wall along respective second and third edges adjacent the first edge and means for interlocking the two complementary members together. Preferably the two interlocking members are of identical design to reduce the manufacturing cost. In the preferred embodiment, the sidewalls are angular so that when one of the interlocking members is removed from the other, i.e., when the top member is removed from the bottom member, a display case is provided. This manner of construction of the sidewalls and the wall along the first edge insures that the contents of the crate will be properly supported for display purposes even with removal of the top interlocking member.

In addition, each of the members is provided with an overhanging brow portion spaced from the base which defines a stacking ledge extending around the enclosure. This ledge cooperates with the outer extremity of the enclosure which constitutes a stacking rim to permit the members to be nested within each other so that they may be stacked for return to the shipper.

In addition, the base on its outside contains a plurality of palletizing socket means. Included are a first array of ribbed enclosures projecting outward of the plane of the underside of the base located between one of the side wall edges and the center line extending mid-way between the sidewall edges and a second array of similarly ribbed enclosures similarly disposed on the other side of the center line and dimensioned so as to mesh with the ribbed enclosures of the first array or those in another crate in a palletizing relation. This permits a plurality of the transport-display cases to be palletized either in a normal fashion or in a criss-cross arrangement.

The invention is disclosed with a transport-display case for eggs used as an example. After stacking the eggs in one of the complementary interlocking members, the other complementary member is placed over the stacked eggs and locked into place whereupon a plurality of such crates filled with eggs can be palletized and shipped to an ultimate destination such as a supermarket. After delivery to the supermarket it is only necessary that the top interlocking member be removed and the bottom with the eggs therein placed in an appropriate cooled shelf display. The interlocking members after use may then be simply stacked one on top of the other to be returned to the shipper.

In its preferred form the interlocking members may each be integrally formed units fabricated from polyethylene, polypropylene or other suitable material by injection molding or other conventional and well-known molding techniques to provide a lightweight, rugged construction capable of withstanding rough handling and guaranteeing a long period of use.

BRIEF DESCRIPTION OF THE DRAWINGS

FIG. 3 is a plan view of the bottom of the member of FIG. 1;

FIG. 6 is a transverse cross section through the assembled crate of FIG. 5;

FIG. 10 is a cross section through the stacked unit of FIG. 9;

FIG. 11 illustrates, in plan view, the manner in which assembled and filled crates may be stacked on a pallet in a cross palletized arrangement; and FIG. 12 is a similar illustration of a plurality of crates in a normal palletized relationship.

DETAILED DESCRIPTION OF THE PREFERRED EMBODIMENT

Figure 1:
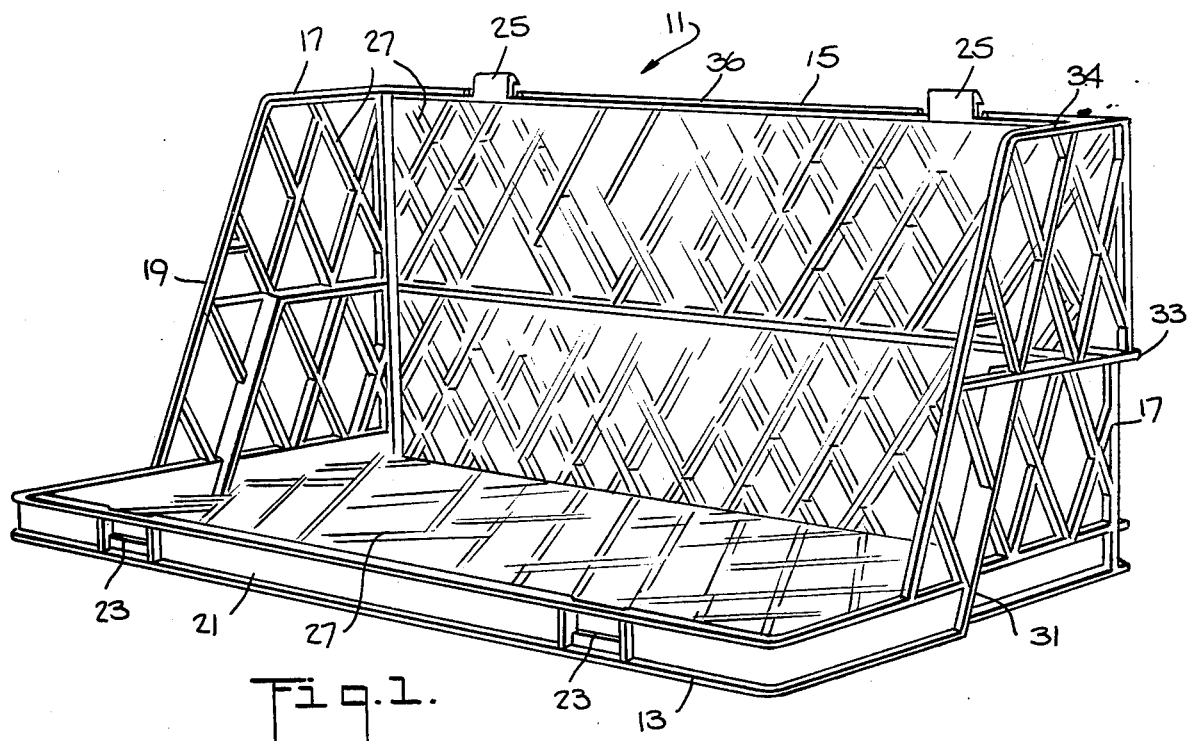
FIG. 1 is a front perspective view preferred embodiment of a complementary interlocking member according to the present invention.
Figure 2:
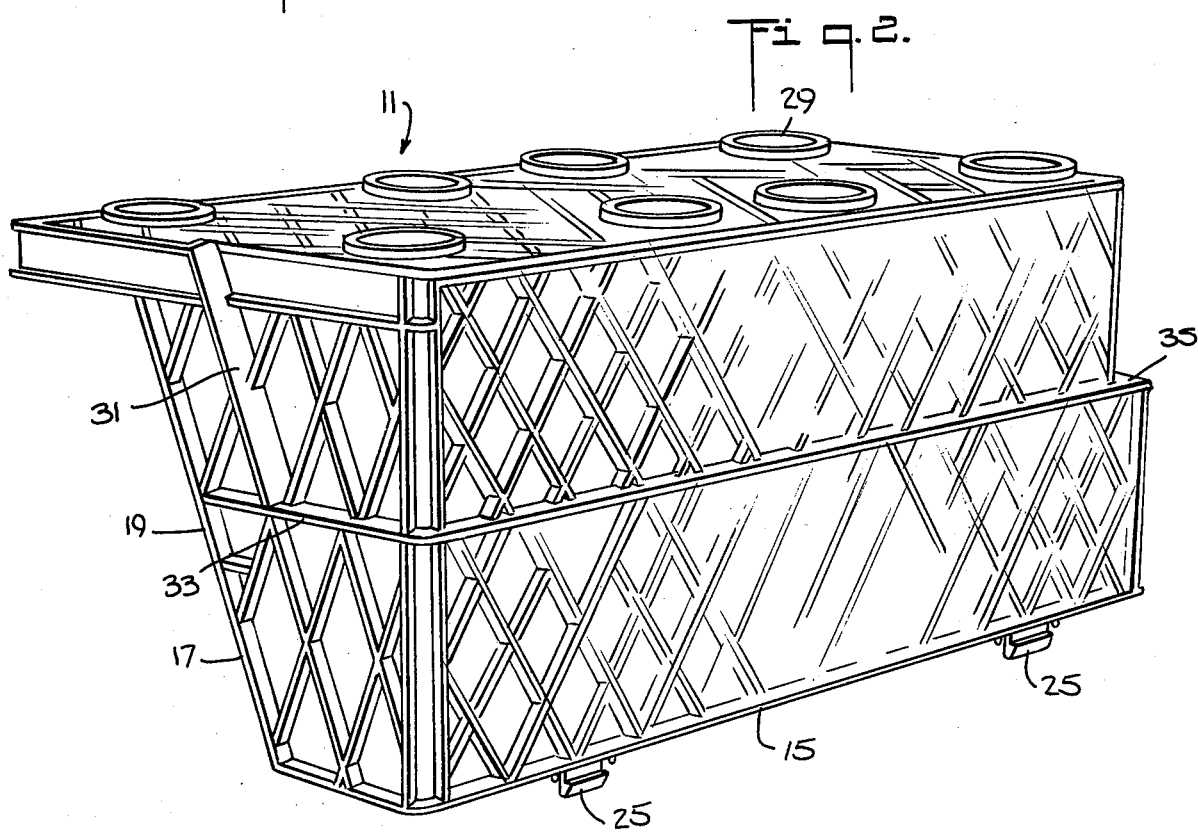
FIG. 2 is a rear perspective view of the member of FIG. 1.

FIGS. 1 and 2 illustrate, respectively, front and rear perspective views of the complementary interlocking members used in the transport-display case according to the present invention. Each interlocking member, designated as 11, includes a base 13 having an upstanding wall 15 along one edge thereof. Sidewalls 17 are attached to second and third edges of the base adjacent the first edge to which the upstanding wall 15 is attached. The sidewalls are rigidly attached to the wall 15. As illustrated, the sidewalls have an angular or diagonal portion 19 running from the top 34 of the sidewall 17 to the base 13. This portion 14 terminates a distance from the fourth edge 21 of the base which is essentially equal to the dimension across the top 34 of the sidewall 17. On the fourth edge 21 a pair of bayonet joint receptacles 23 are provided. These are adapted to mate with bayonet type latches 25 on the upper margin or edge 36 of the wall 15. As illustrated, the member 11 is of an open lattice work construction and will preferably be molded of plastic. This construction will result in the necessary strength and at the same time keep the weight of the crate down. As illustrated, each of the base, upstanding wall 15 and sidewalls 17 contain a plurality of lattice members 27. On the outside of the base 13 are a plurality of socket means 29 to be explained in more detail below. Extending around the outside of the sidewalls 17 and upstanding wall 15, is an overhanging brow portion 20 defining a stacking ledge. This overhanging brow portion is formed by the angular portions 31 on each side wall, the horizontal members 33 on those sidewalls and the horizontal overhanging member 35 on the upstanding wall. The manner in which this permits nesting of the interlocking member will be described in more detail below.

Figure 5:
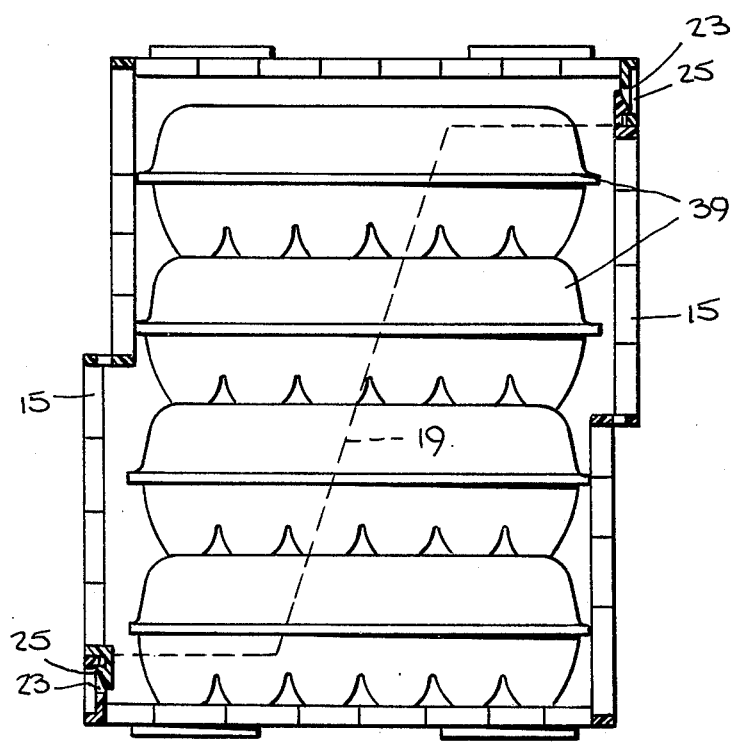
FIG. 5 is a longitudinal cross section through the assembled crate of FIG. 4.

FIG. 3 is a plan view of the bottom of the complementary members shown on FIGS. 1 and 2. Illustrated thereon are the socket means 29. As shown, two different sizes of socket means designated 29a and 29b respectively, are shown. The socket means 29a comprise a first array of ribbed enclosures projecting outwardly of the plane of the underside of the base (see FIG. 5) and located between one of the sidewalls and a centerline 37 located midway between the two sidewalls. In the illustrated embodiment these are circular sockets although any other shape such as square, rectangular, diamond, etc. may equally be used. The second array of ribbed enclosures 29b are similarly disposed on the other side of the center line 37 and are dimensioned so that their inside diameter corresponds to the outside diameter of the socket in array 29a to permit them to mesh when stacking crates one on top of the other for palletizing as will be described in more detail below in connection with FIGS. 11 and 12. Also illustrated on this Figure is the overhanging brow portion defining the stacking ledge. Thus the portions 31, 33 and 35 which make up this stacking ledge can clearly be seen. Portion 35 also includes bayonet receptacles 38 to accept the bayonets 26 when stacked.

Figure 8:
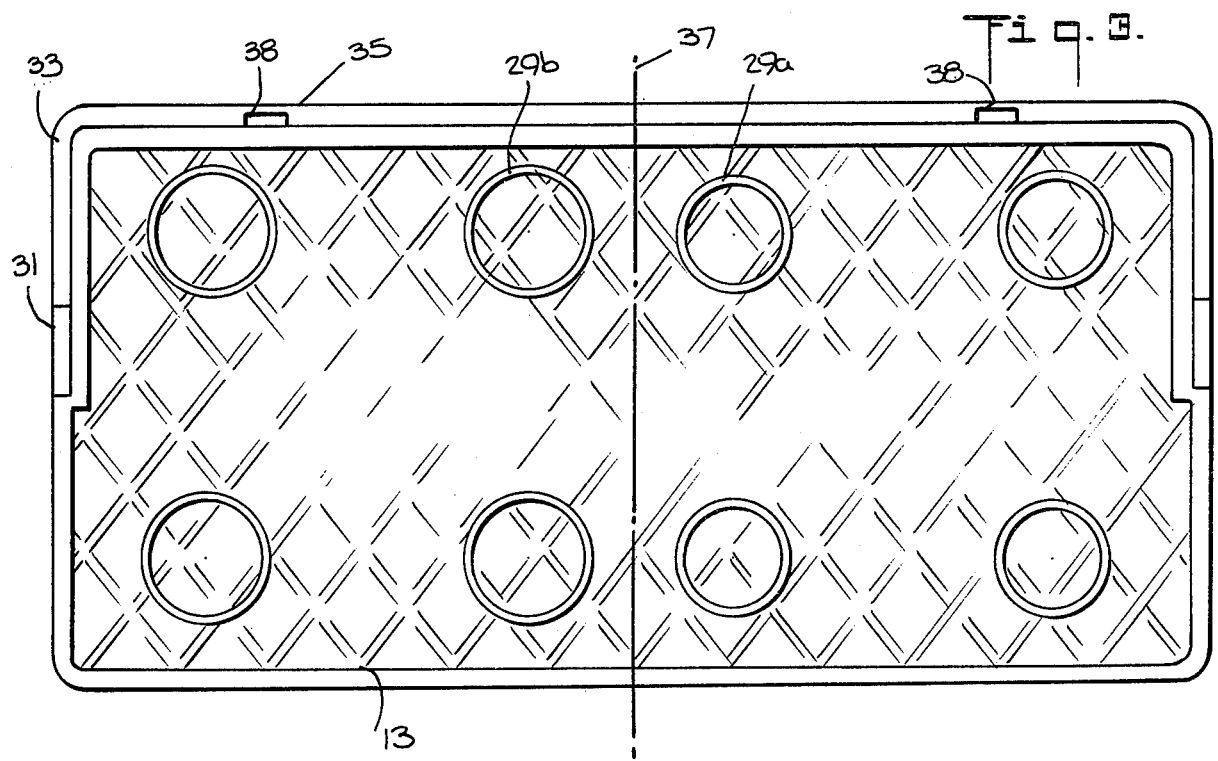
FIG. 8 is a perspective view illustrating the bayonet type interlocks used to hold the two members together.
Figure 4:
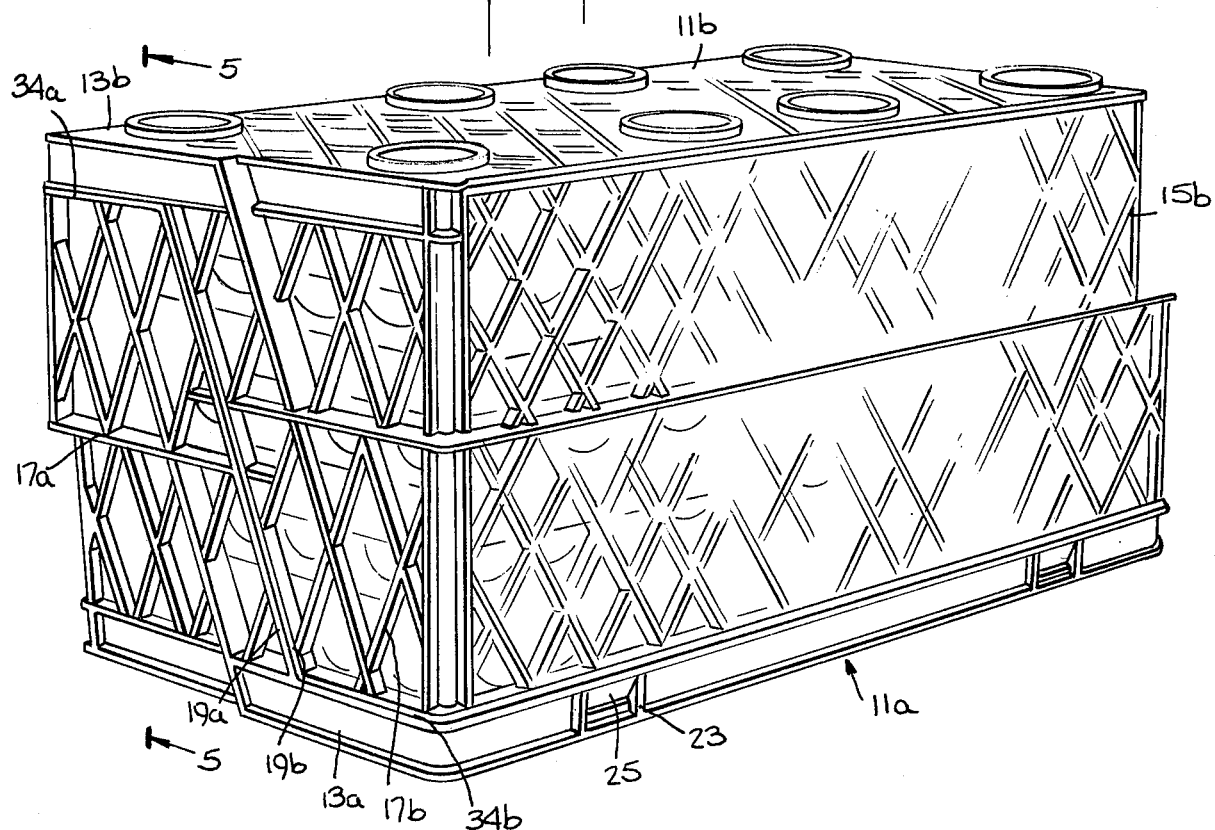
FIG. 4 is a perspective view illustrating two interlocking members assembled together and filled with egg cartons.

FIG. 4 is a perspective view illustrating two of the interlocking members of FIGS. 1 and 2 assembled together to form a transport crate. The upper member and its parts have the letter *b* associated therewith and the lower member the letter *a* associated therewith. In the remainder of the disclosure the transport crate will be discussed as a transport crate for cartons of eggs. However, it will be recognized that many other products can be transported in a crate of this nature and eggs are used only as an example. Longitudinal and cross-sectional view of the assembled crate of FIG. 4 are shown respectively on FIGS. 5 and 6. From these three Figures, the manner in which a plurality of egg cartons 39 are stacked with the member 11a with the bottom row of the egg cartons 39 resting on base 13a is evident. On the sides, the egg cartons are retained by the sidewalls 17e. Once the eggs are packed into the member, 11a the complementary member 11b is placed over the top so that its base 13b forms the top of the crate and its sidewalls 17b mate with the sidewalls 17a of the member 11a to form a solid sidewall. As is most clearly shown by FIG. 4 and by the dotted line of FIG. 6, the angular portions 19 of the sidewalls 17 are in contact with each other. The top 34a of the sidewall of the bottom interlocking member rests against the base 13b of interlocking member 11b. The top 34b of the side 17b of the top interlocking member 11b rests against the base 13a of the bottom member 11a. The two interlocking members are locked together by means of the bayonet couplings comprising the bayonets 25 and bayonet receptacles 23. This coupling arrangement is shown in more detail on FIG. 8. As illustrated thereon, in addition to the bayonet 25 a pair of pins 41 are provided on each side thereof and a pair of holes 43 provided on each side of the bayonet receptacle 23. This aids in alignment of the two members and ensures that they stay properly positioned with respect to each other. As noted above, the members are made of a plastic material which will have the necessary flexibility so that the bayonet 25 may deflect the necessary amount to ride over the edge 45 to lock in place in the receptacle opening 23.

Thus, after filling one of the members with the items to be shipped, e.g. egg cartons 39, the other member is placed on top thereof and locked into place using the bayonet 25 and bayonet receptacles 23. A plurality of such crates may then be stacked on pallets and shipped to the ultimate destination. This manner of palletizing will be described below in more detail in connection with FIGS. 11 and 12.

Figure 9:
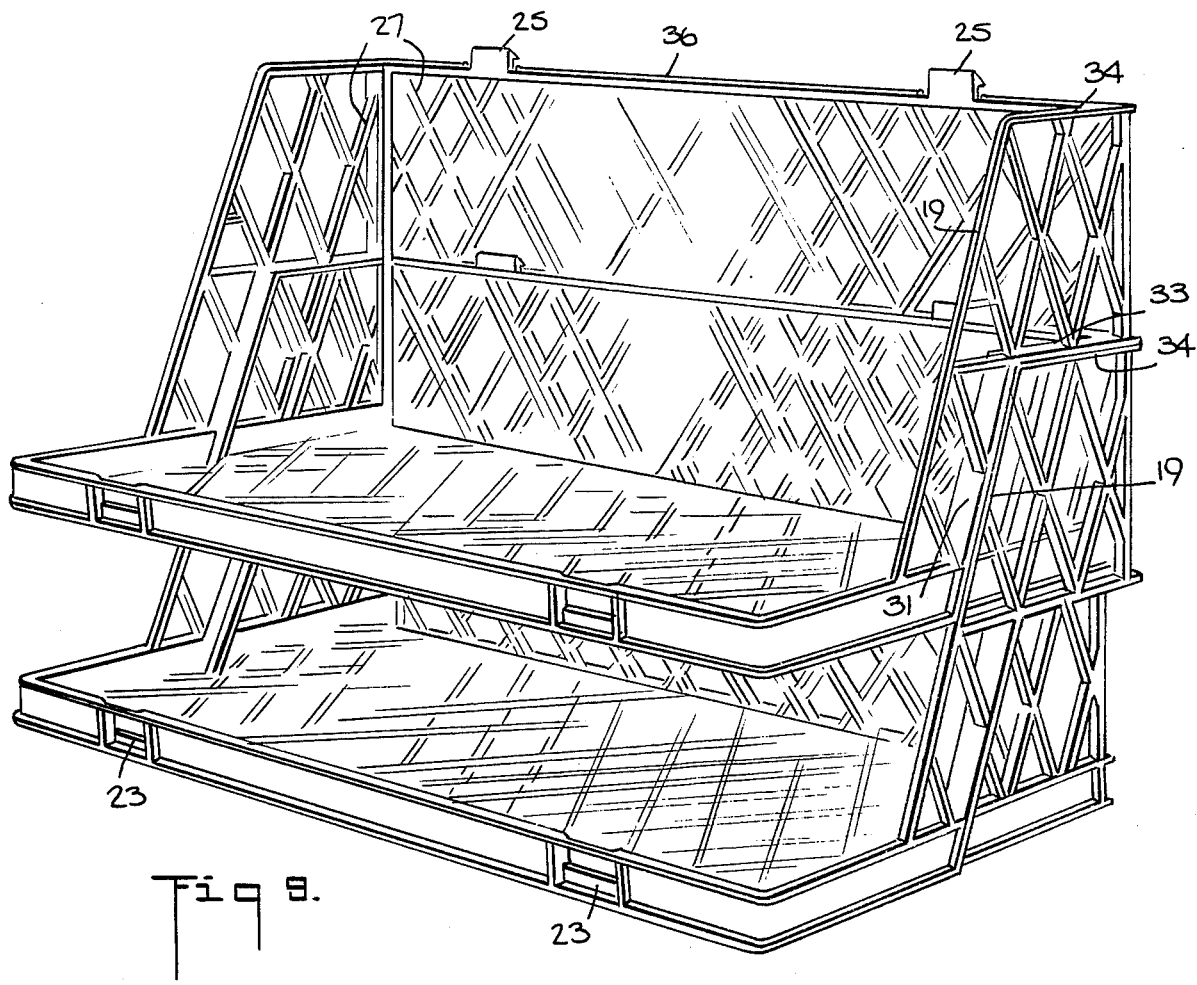
FIG. 9 is a perspective view illustrating two interlocking members stacked after use ready to be returned to the shipper.
Figure 7:
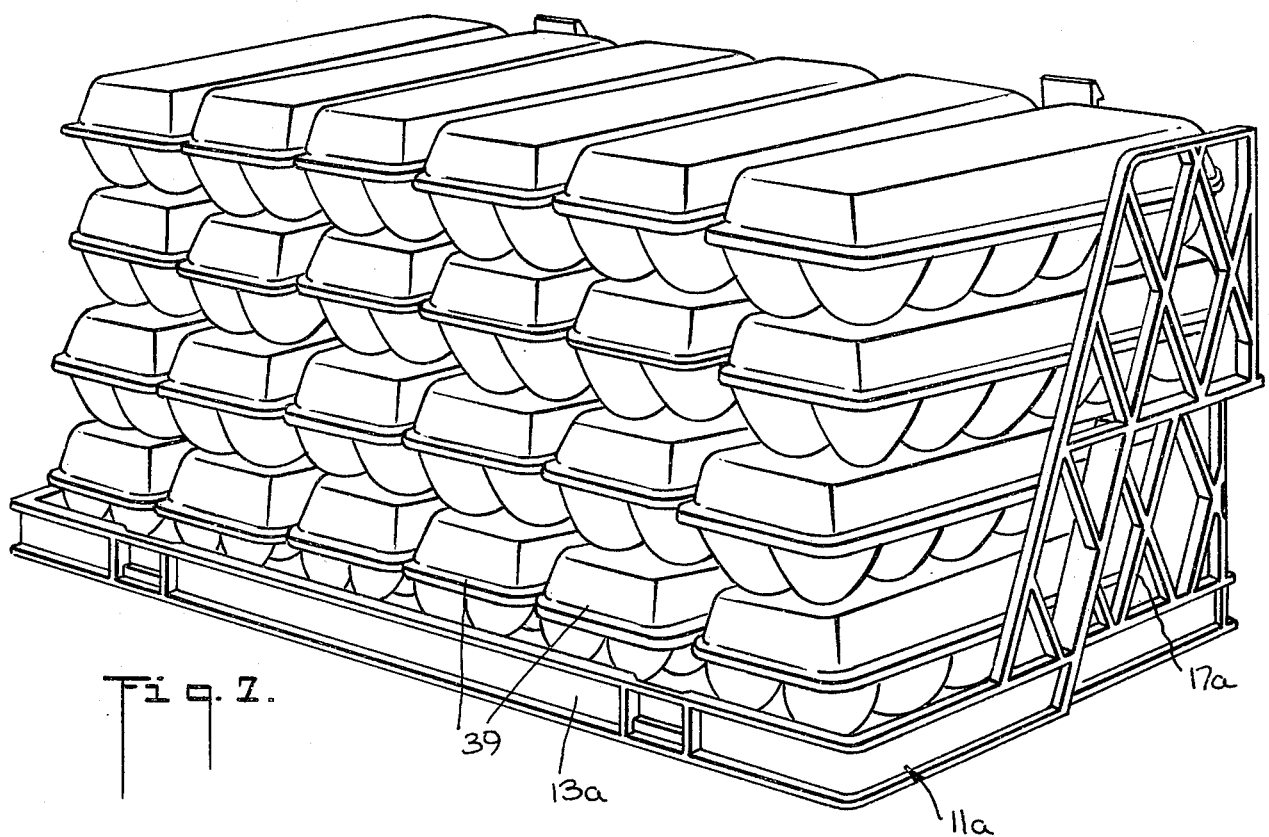
FIG. 7 illustrates the filled crate of FIG. 4 after removal of the top member with the remaining member used as a display.
Figure 5:
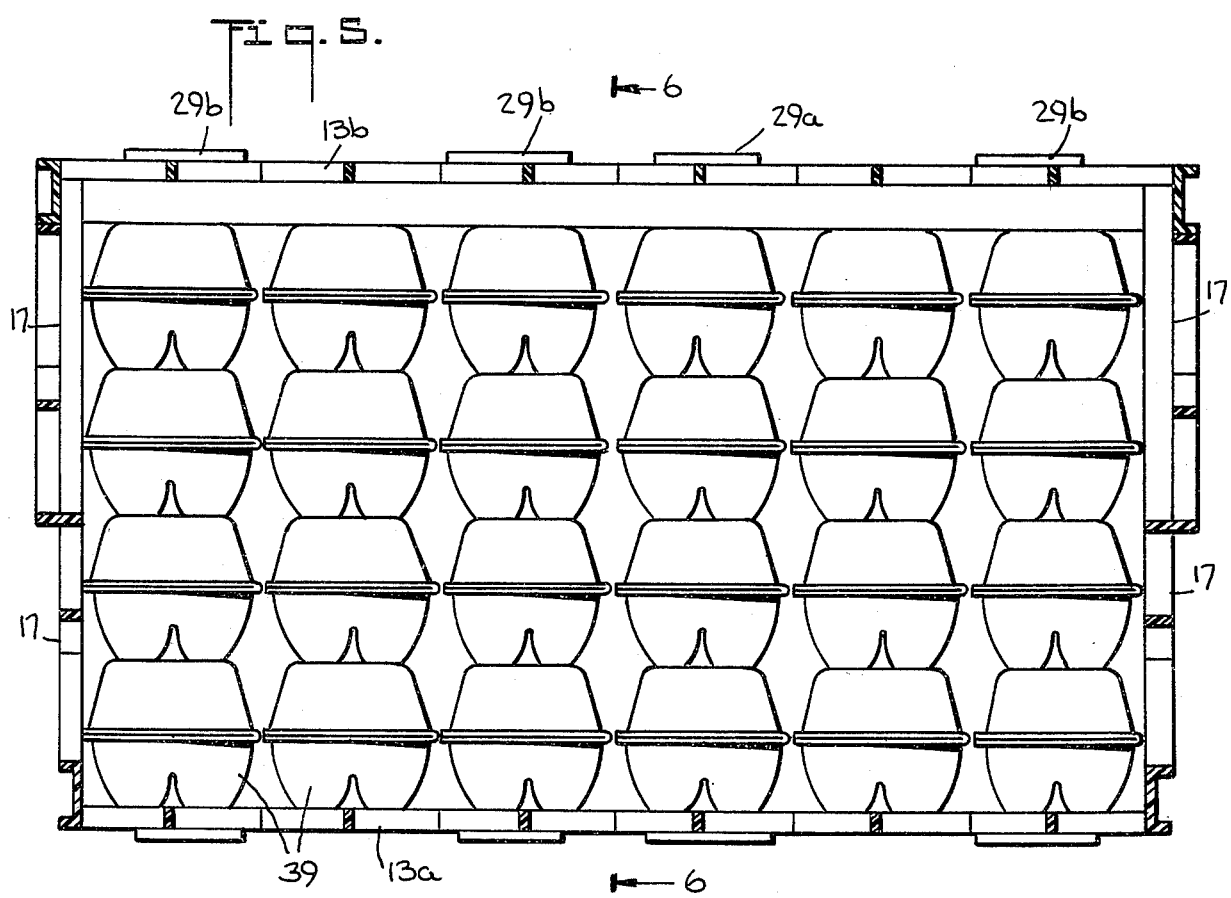

When the transport carton reaches its ultimate destination it may be converted into a display carton in simple fashion by removal of the top member 11b of FIG. 4. The result of this removal is illustrated by FIG. 7. Here, the top member 11b has been removed with only the member 11a remaining. The egg carton 39 are stacked on the base 13a of the member 11a. The manner in which the sidewalls 17a are recessed provides lateral support while still permitting easy access to all egg cartons 39. Thus, this display crate may be simply placed in the proper refrigerated area of the store to permit customers to remove the egg cartons as required. The top member 11b will be set aside to be returned to the shipper along with other members. The manner in which the spaced brow portion made up of the parts 31, 33 and 35 disclosed in connection with FIGS. 1, 2 and 3 is used to permit stacking of the complementary interlocking members for return to the shipper is illustrated by FIGS. 9 and 10. The empty crates are stacked one on top of the other with the stacking edge made up of the portion 31, 33 and 35 resting on the top outer extremity of the member 11 therebelow made up of the portion 19, 34 and 36, these portions comprising a stacking rim which is complementary to the ledge. As shown on FIG. 3, and also by FIG. 10, the portion 35 of the ledge includes bayonet receptacles 38 for accepting the bayonets 25 of the lower unit. Although only a pair of members are shown as being stacked, it will be recognized that a larger plurality can be stacked in similar fashion.

FIGS. 11 and 12 illustrate in plan view the manner in which transport crates such as that of FIG. 4 may be palletized.

FIG. 11 shows an arrangement for cross-palletizing. In this figure the pallet 51 is illustrated in dot-dash lines and the lower layer of crates 52 in dotted lines. As illustrated, the lower layer will comprise six crates 52a-

-52f arranged in two rows of three with a small space 53 separating the two rows. As shows, the crates in a row abut one another. Stacked on top of this layer will be crates 55a-55f in the arrangement shown in solid lines. The arrangement shown in solid lines can be reversed in the next layer with the following layer being the same as the first layer of crates 52a-52e. In this manner the layers can be criss-crossed and interlocked together using the ribbed enclosures disclosed in connection with FIG. 3. Alternately, normal column palletizing can be accomplished with an arrangement such as that shown on FIG. 3. In this arrangement crates 57 are simply stacked in columns with the ribbed enclosures of one crate engaging the mating ribbed enclosures of a single crate directly therebelow rather than, in some cases, engaging enclosures of more than one crate as in FIG. 11.

Thus, an improved reuseable transport-display crate which is lightweight, easy to pack and which can in simple fashion be converted from a transport crate to a display crate has been shown. Although specific embodiments of the invention have been illustrated and described, it will be obvious to those skilled in the art that various modifications may be made without departing from the spirit of the invention which is intended to be limited solely by the appended claims.

What is claimed is:

1. An integrally molded plastic transport-display crate adapted to hold a plurality of one dozen egg cartons for transport comprised of a pair of complementary separable similarly shaped upper and lower interlocking members ech having a generally rectangular base, an upstanding wall along a first edge thereof, a pair of opposed angular sidewalls adjoining said upstanding wall along respective second and third edges adjacent said first edge the enclosure defined by said sidewalls and said upstanding wall having an overhanging brow portion spaced from said base and defining a stacking ledge extending around the three walls of said enclosure parallel to said base, the outer extremity of said enclosure constituting a stacking rim parallel to said base complementary to said ledge and complementary releasable locking means on said member to hold them together in opposed juxtaposition to define a transport crate, said upper member removable to render said lower member a display rack for said egg cartons, either said member being nestable within the other said member when disengaged therefrom with its said stacking ledge resting on the stacking rim of said other member, a plurality of bayonet receptacles on said ledge and a corresponding plurality of bayonet elements on said rim adapted to engage said receptacles in an adjacent member when in stacked relationship to maintain said members in such conditions, said ledge, rim, bayonet receptacles and bayonet elements constituting the sole stacking support for said members, a plurality of said members having their vertical axes aligned, when nested relative to one another, with a vertical axis perpendicular to the bases thereof 2. A crate according to claim 1 in which said base, said sidewalls and said upstanding wall are comprised of an open lattice work construction.

3. An integrally molded plastic enclosure member adapted for releasable assembly with a similarly shaped member to form an enclosed transport-display crate, said member having a generally rectangular base, an upstanding wall along a first edge thereof, a pair of opposed angular sidewalls adjoining said upstanding wall along respective second and third edges adjacent said first edge the partial enclosure defined by said sidewalls and said upstanding wall having an overhanging brow portion spaced from said base defining a stacking ledge extending around the three walls of said enclosure parallel to said base, the outer extremity of said enclosure constituting a stacking rim parallel to said base complementary to said ledge and locking means on said member to hold it together with another said member in opposed juxtaposition to define a transport crate, said member being nestable within the other said member in disassembled condition with its said stacking ledge resting on the stacking rim of said other member and having its vertical axis aligned in such nested position with a vertical axis perpendicular to said base, said base, said sidewalls and said upstanding wall being comprised of an open lattice work construction, a plurality of bayonet receptacles on said ledge and a corresponding plurality of bayonet elements on said rim adapted to engage said receptacles in an adjacent member when in stacked relationship to maintain said members in such condition said ledge, rim, bayonet receptacles and bayonet elements constituting the sole stacking support for said members.

* * * * *